P. H. LANGE & H. L. WEIGEL.
SHEET SHEARING MACHINE.
APPLICATION FILED FEB. 24, 1913.
1,105,668.
Patented Aug. 4, 1914.
3 SHEETS—SHEET 1.
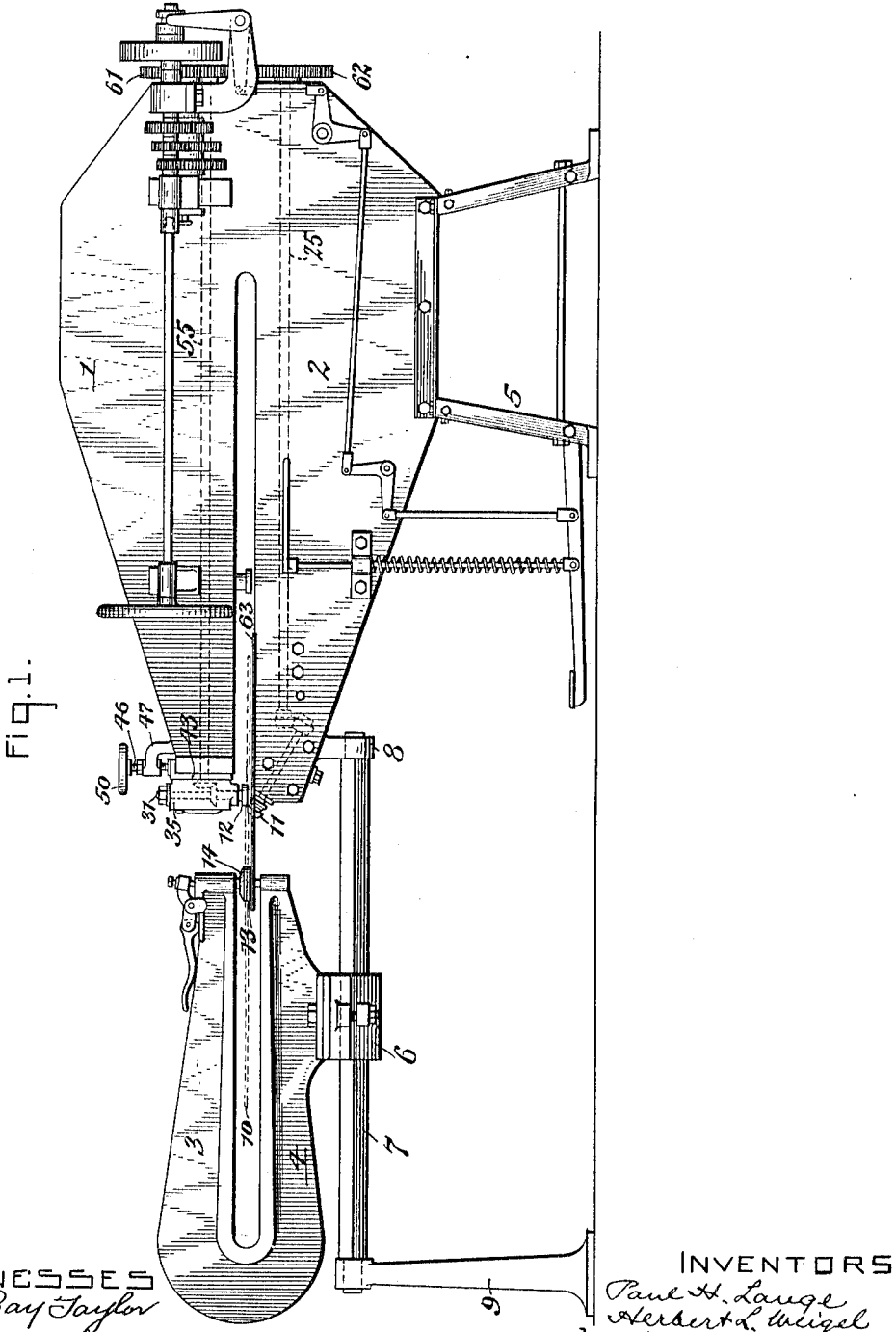

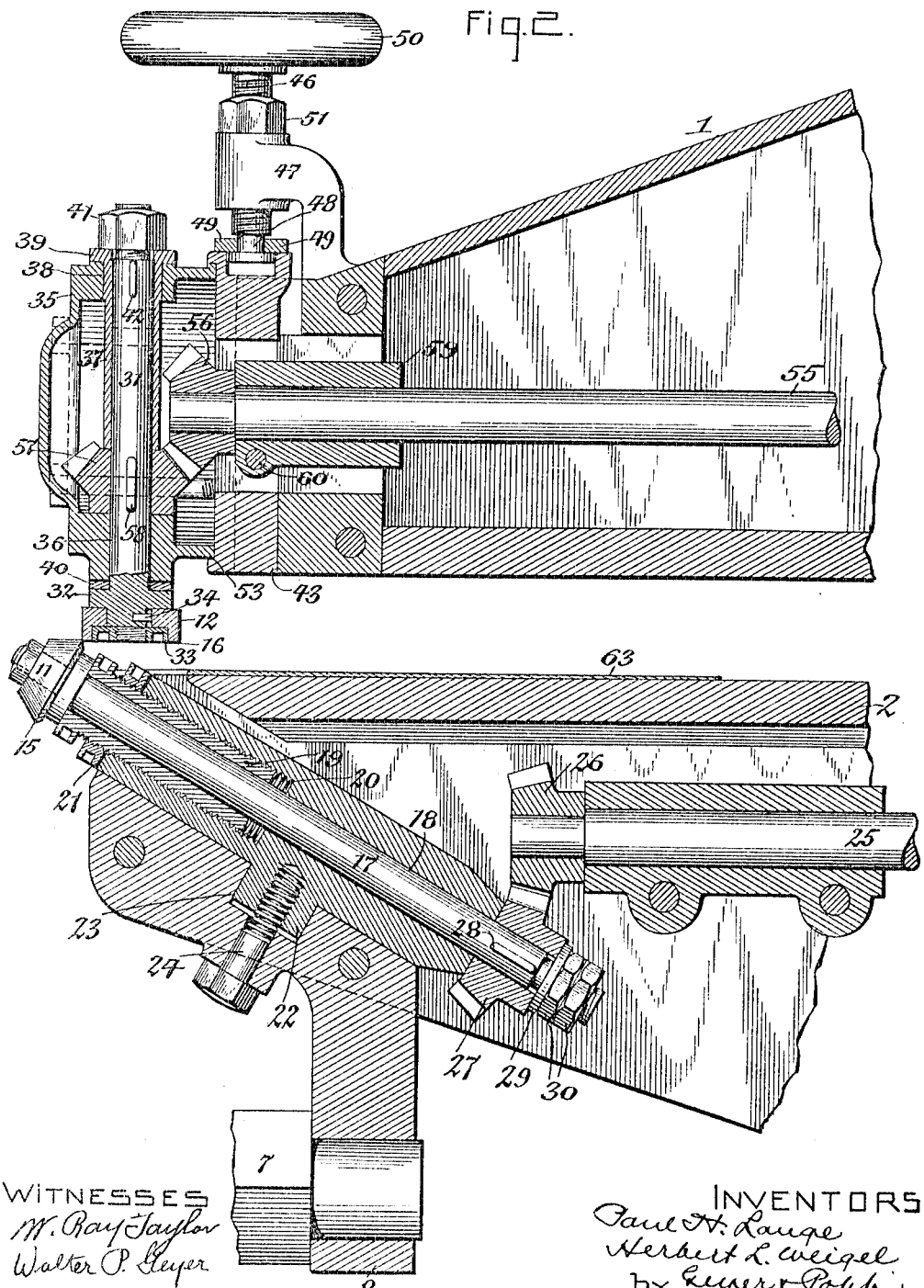

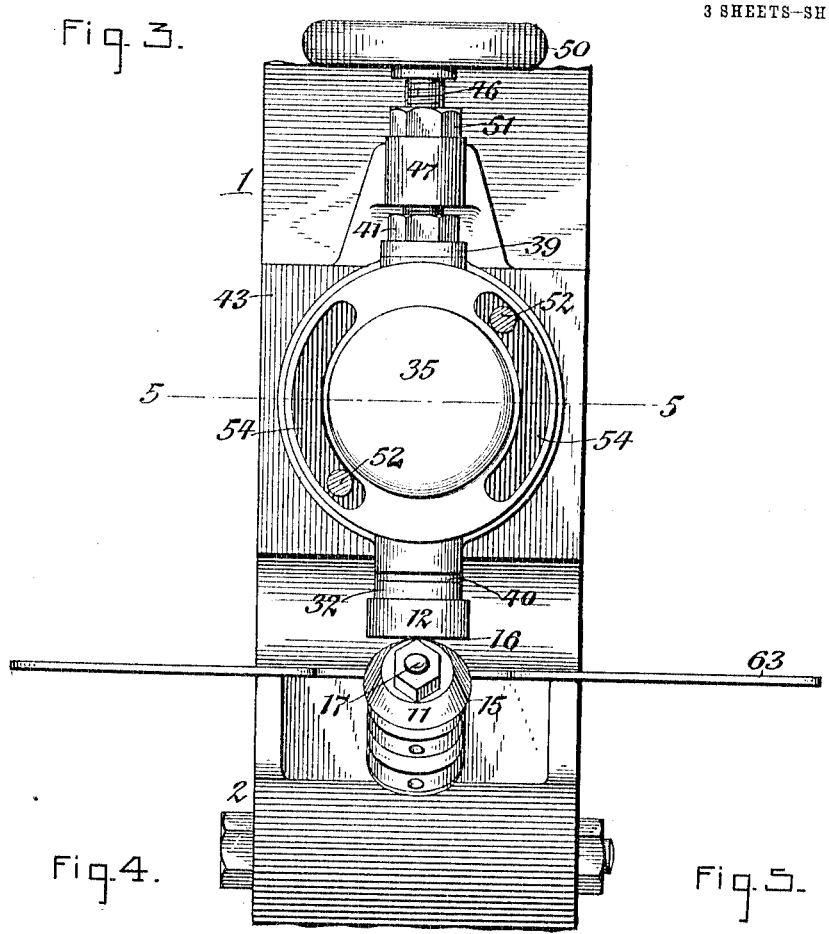

UNITED STATES PATENT OFFICE.

PAUL H. LANGE AND HERBERT L. WEIGEL, OF BUFFALO, NEW YORK, ASSIGNORS TO NIAGARA MACHINE & TOOL WORKS, OF BUFFALO, NEW YORK, A CORPORATION OF NEW YORK.

SHEET-SHEARING MACHINE.

1,105,668. Specification of Letters Patent. Patented Aug. 4, 1914.

Application filed February 24, 1913. Serial No. 750,160.

*To all whom it may concern:*

Be it known that we, PAUL H. LANGE and HERBERT L. WEIGEL, citizens of Germany and of the United States, respectively, residing at Buffalo, in the county of Erie and State of New York, have invented new and useful Improvements in Sheet-Shearing Machines, of which the following is a specification.

This invention relates to that class of shearing machines with rotating cutters which are designed for effecting either straight, circular or curved cuts on sheet metal plates. In machines of this character as heretofore constructed the cutters were suitable only for a limited range, some being provided with two parallel horizontal rotary cutters capable of cutting disks and straight lines only and others having an upper horizontal cutter and a lower inclined cutter capable of also cutting rings. Shearing machines with both the upper and lower cutters inclined have also been used and are capable of cutting reverse curves but are incapable of cutting rings and disks of small diameter with the aid of a clamping attachment which is necessary to hold the sheet metal plate rigid for producing accurate work. Furthermore, the machines heretofore in use had the cutters so arranged that it was difficult to closely observe the operation of the cutters on the sheet.

It is the object of this invention to produce a machine of this character in which the rotary cutters are so arranged relatively to each other as to permit of cutting with facility sheet metal plates on reverse curves or into disks or rings and to permit of bringing the sheet clamping devices closer to the cutters than has been possible heretofore for producing cuts of smaller diameter, also to so arrange the cutters that the operation of the same can be more easily and conveniently observed and to provide a simple, efficient and reliable adjusting and driving mechanism for the cutters which will permit of quickly and conveniently adjusting the same into their proper working position either while assembling the machine or taking care of wear.

In the accompanying drawings consisting of 3 sheets: Figure 1 is a side elevation of a sheet shearing machine embodying our improvements. Fig. 2 is a fragmentary vertical longitudinal section, on an enlarged scale, of the cutter mechanism of the machine. Fig. 3 is an end elevation of the same. Fig. 4 is a top plan view thereof. Fig. 5 is a fragmentary horizontal section taken in the correspondingly numbered line in Fig. 3.

Similar characters of reference indicate corresponding parts throughout the several views.

In its general organization the main frame of this machine comprises a cutter section which supports the cutter mechanism and a clamping section which supports the sheet to be cut while the same is being fed past the cutters. As shown in Fig. 1, the cutter section of the frame has the general shape of the letter U laid on its side so as to form an upper arm 1 and a lower arm 2 which are separated from each other by a horizontal gap extending outwardly from the inner end of this frame section, and the clamping section also has the shape of the letter U laid on its side so as to form an upper arm 3 and a lower arm 4 which are separated from each other by a horizontal gap extending outwardly from the inner end of this frame, the gaps of both frame sections being arranged horizontally in line and opposite each other. The cutter frame section is mounted upon a base 5 which may be of any suitable construction and the clamping frame section is preferably mounted on a carriage 6 which is slidable horizontally toward and from the cutter frame section by mounting this carriage on a horizontal longitudinal guide bar or track 7 which is supported at its inner end by means of a hanger 8 depending from the lower arm of the cutter frame section while its outer end is mounted on a standard 9 rising from the floor.

10 represents the sheet of metal or the like which is to be cut or sheared either along circular, curved, reverse curved or other lines for producing various shapes according to the desired article which is to be made. When cutting this sheet along circular lines for producing either circular disks or rings of sheet metal the blank is inserted into the gaps of the cutter and clamping frame sections and is pivotally mounted on the clamping frame section so that the marginal portion of the sheet may be moved circumferentially through the gap of the cutter frame section and past the cutter mechanism for slitting the sheet on a circular line. The pivotal support for this purpose may be variously constructed but that shown in the drawings comprises lower and upper clamping disks 13, 14 which are adapted to engage with the under and upper sides of the sheet, the lower clamping disk being pivotally mounted for horizontal rotation on the lower arm of the clamping frame section and the upper clamping disk being mounted on the upper arm of the clamping frame section so as to be capable of moving axially toward and from the lower clamping disk for clamping the sheet between the same or releasing the sheet, and also capable of rotating horizontally, so that when the sheet is gripped between the two clamping disks the same may be turned horizontally about a vertical axis.

11, 12 represent the two cutter disks or wheels of the cutter mechanism which coöperate with each other and are adaped to shear or sever the sheet of metal which is moved between the same. One of these cutters, preferably the lower one 11, is of conical form and rotates about an axis which is inclined lengthwise of the machine so that its narrow end is at the front and its large end is at the rear and presents an annular cutting edge 15 at its rear end to the underside of the sheet of metal to be operated upon. The upper cutter is preferably constructed in the form of a cylindrical disk which rotates about an axis which is vertical or substantially so and is provided with an annular cutting edge 16 at the lower corner formed between the underside and the periphery of this disk, which corner engages with the upper side of the sheet of metal to be cut or sheared. In the operative position of the upper cutter relatively to the lower cutter the upper cutter disk is arranged in rear of the lower cutter and the front part of the cutting edge of the upper cutting disk is arranged close to or engages with the upper rear part of the cutting edge of the lower disk, as shown in Figs. 1 and 2, so that a sheet of metal which is moved past the coöperating edges of the cutting disks will be sheared, the line of shearing depending upon the direction of movement of the sheet. Various means may be provided for supporting and driving these cutting disks and also adjusting the same relatively to each other in assembling the machine and also for taking up wear on the cutting disks, as well as adapting them to the particular character of the sheet which is being operated upon. The mechanism for this purpose which is shown in the drawings and which has been found suitable in practice is preferred and constructed as follows: 17 represents an inclined lower cutter spindle arranged lengthwise of the cutter frame section or substantially so and journaled in an inclined bearing block having a rear bearing section 18 which is incapable of longitudinal movement and receives the rear part of the lower cutter spindle, and an axially movable front bearing section 19 which receives the front part of the lower cutter spindle. The axially movable front bearing section of the bearing block is preferably constructed in the form of a sleeve or tube and is adjustably connected with the rear bearing section, preferably, by means of an external screw thread on the sleeve and engaging with an internal screw thread formed in a socket 20 extending forwardly from the rear bearing section and formed integrally with the latter. The lower cutter disk or wheel is mounted on the front end of the lower spindle and bears with its rear side against the front end of the adjustable bearing sleeve 19. Upon turning the latter in the socket 20, the lower cutter may be raised and lowered and also moved forwardly and backwardly into the desired position, this movement of the adjusting sleeve being due to the screw connection between the same and the rear bearing section. After adjustment the bearing sleeve is held in position by means of a clamping screw nut 21 engaging with the front part of the adjustable bearing sleeve and engaging with the front end of the socket on the rear bearing section. The bearing block of the lower spindle is mounted on the lower arm of the cutter frame section so as to be capable of turning the lower spindle and the cutter mounted thereon in a plane parallel with the angle of inclination of this spindle, this being preferably effected by means of a depending pivot, stud, or trunnion 22 arranged on the underside of the lower bearing section and journaled in a bearing 23 formed in the adjacent lower part of the lower arm of the cutter frame section. After the bearing block of the spindle has been adjusted into the required position the same is held in place by a clamping device which preferably consists of a clamping screw 24 arranged axially in line with the pivot or trunnion 22 and passing through an unthreaded opening in the adjacent lower arm on the cutter frame section and engaging its head against the underside of this arm while its upper threaded end engages with a threaded opening in said pivot or trunnion, as shown in Fig. 2.

The means for driving the lower cutter which are shown in the drawings comprise a lower horizontal driving shaft 25 journaled in suitable bearings on the lower arm of the cutter frame and intermeshing bevel gear wheels 26, 27 secured respectively to the front end of the lower shaft and the rear end of the lower spindle. In order to permit the lower spindle to be moved lengthwise in the bearing block without interfering with the driven bevel gear wheel 27 mounted thereon the latter is connected with this spindle by means of a spline 28 or otherwise and the same is held in its proper position relatively to the bevel gear on the lower driving shaft by engaging the front side of the spindle gear wheel with the rear end of the rear bearing section and its rear side with a washer 29 which is mounted on the rear part of the lower spindle and held in place by means of two clamping screw nuts 30 engaging with the threaded rear part of the lower spindle and the rear side of said washer, as shown in Fig. 2. The axis of the lower driving shaft 25 and the axis of the pivot or trunnion 22 preferably intersect at a point located in the axis of the lower cutter spindle so that upon swinging the bearing block of the lower spindle about said trunnion for adjusting the position of the lower cutter to the upper cutter there will be practically no interference with the operative relation between the intermeshing gear wheels 26, 27.

31 represents an upper cutter spindle which is arranged vertically or substantially so. To the lower end of this upper spindle the upper cutter disk or wheel 12 is secured so as to turn therewith. The connection between the upper cutter and the upper spindle may be effected in various ways but preferably by engaging the lower part of the upper spindle with a central opening in the upper cutter disk and clamping the latter between an upper thrust collar or shoulder 32 formed on this spindle and engaging with the upper side of the upper cutter and a screw nut 33 applied to the lower threaded end of the upper spindle and engaging with a counter bore or rabbet on the underside of the lower cutter, as shown in Fig. 2. The upper spindle and cutter are preferably compelled to turn with each other by means of a key 34 arranged on the upper spindle and engaging with a key way in the bore of the upper cutter. The upper cutter spindle is mounted in a supporting head 35 which is capable of rotation about an axis which is arranged horizontally and lengthwise of the machine. The lower part of the upper spindle is journaled in a lower bearing 36 formed in the lower part of the supporting head and the upper part of this spindle is provided with a surrounding bearing sleeve 37 which is journaled in an upper bearing 38 formed on the upper part of this head. This bearing sleeve is provided at its upper end with an external annular flange or shoulder 39 which engages with the upper side of the supporting head so as to hold this sleeve against downward movement. Upward movement of the upper spindle and cutter is resisted by a thrust bearing which is preferably formed by means of a washer 40 surrounding the lower part of the upper spindle and interposed between the upper side of the thrust collar 32 on the upper spindle and the underside of the supporting head, as shown in Fig. 2. This thrust collar is held up against the underside of the supporting head by means of a screw nut 41 applied to the upper end of the upper spindle and engaging with the upper end of the bearing sleeve. In order to permit the upper spindle to move vertically independently of the bearing sleeve 37 and still compel the latter to turn with the upper spindle these parts may be connected by means of a spline or feather 42, as shown in Fig. 2, or by any other suitable means.

43 represents a vertically movable carriage which is mounted on the front end of the upper arm of the cutter frame section and upon which the vertically rotatable supporting head is pivotally mounted. This carriage may be guided on the respective upper arm in various ways but preferably by means of a dove tail slide 44 formed on the rear side of this carriage and engaging with a correspondingly shaped way 45 on the respective frame arm, as shown in Fig. 5. The vertical movement of this carriage may also be effected by any suitable means, the means for this purpose shown in the drawings being preferred and consisting of an upright adjusting screw 46 having its thread working in a threaded opening formed in an overhanging bracket 47 on the upper arm of the cutter frame section and connected with the carriage by a swivel which is formed by a reduced neck 48 arranged on the lower end of the adjusting screw and engaged on its opposite sides by two coupling plates 49 secured to the upper end of the carriage. Upon turning the adjusting screw 46 in one direction or the other by means of a hand wheel 50 at the upper end of this screw the same rises or falls in the bracket 47 and thereby moves the carriage up or down accordingly, together with the parts mounted thereon. After adjustment this screw is held in position by means of a screw nut 51 applied to the upper part thereof and engaging with the upper side of said bracket. The vertical rotation of the supporting head upon the carriage is preferably effected by constructing the rear part of this head of circular form and engaging the same with a correspondingly shaped seat or bearing 53 on the front side of the carriage, as shown in Figs. 2, 3 and 5. After adjustment the supporting head is held in position by means of a clamping device which preferably comprises two clamping screws 52 passing horizontally through segmental slots 54 formed on opposite sides of the supporting head and bearing with the heads at their front ends against the front side of the supporting head while their threaded rear ends engage with threaded openings in the adjacent part of the carriage.

Motion may be transmitted to the upper spindle and the cutter mounted thereon in any preferred manner the means for this purpose shown in the drawings being suitable and comprising an upper horizontal driving shaft 55 arranged in the upper arm of the cutter frame section and a pair of intermeshing bevel gear wheels 56, 57 mounted respectively on the front end of the upper driving shaft and on the upper spindle between the upper bearing sleeve 37 and the lower bearing of the supporting head, as shown in Fig. 2. In order to permit the upper spindle to be adjusted vertically independently of the gear wheel 57 and still compel the latter to turn with this spindle a driving connection between the same is effected by means of a spline or feather 58, as shown in Fig. 2. The front end of the upper driving shaft is journaled in a bearing 59 which is pivotally mounted on the adjacent part of the carriage 43 by means of a horizontal pivot pin 60 so that this bearing is caused to rise and fall with the carriage and is also capable of tilting slightly and accommodate itself to the changing position of the carriage upon raising and lowering the same without producing a cramping action of the upper driving shaft in its bearing.

The rear ends of the upper and lower driving shafts are journaled in suitable bearings on the rear or outer part of the cutter frame section and these two shafts are caused to turn in unison by intermeshing gear wheels 61, 62 secured respectively to the rear ends thereof. Motion may be transmitted by any suitable means from a prime mover to either one or the other of these driving shafts but as the same forms no part of this invention a detail description of the same is not deemed necessary.

During the operation of moving a sheet past the cutters the same is preferably supported on a table 63 which is affixed to the front end of the lower arm of the cutter frame section.

It will be noted that in this machine the upper cutter disk turns horizontally about a vertical axis and engages its lower front part with the upper rear part of the lower cutter disk. Owing to this arrangement of the two cutters the space above the same is not obstructed and a clear view is obtainable immediately at the cutting point so that the operator is able at all times to closely observe the progress of the work in hand. Such close observation of the work of the machine has not been possible in sheet shearing machines of this character as heretofore constructed and this necessarily resulted in more or less imperfect work and also required the work to be done somewhat slower whereby the capacity of the machine was reduced. Furthermore, this arrangement of the cutters enables the same to be brought much closer to the pivotal center of the blank which is held between the clamping disks, thereby rendering it possible to cut the sheet on circular lines of a much smaller radius or diameter than has been possible in machines as heretofore constructed in which the center of the clamping device was incapable of approaching as close to the cutters. This machine therefore has a much wider range of operation inasmuch as it is capable of not only shearing sheet metal for producing articles therefrom of larger diameters as has been possible heretofore, but also of much smaller diameters which have heretofore been impossible in machines of this character.

We claim as our invention:

1. A sheet shearing machine comprising a pair of coöperating cutter wheels or disks, one of said disks turning about an inclined axis, and the other disk turning about an upright axis and engaging its front part with the rear part of the other disk.

2. A sheet shearing machine comprising a pair of coöperating cutter wheels or disks, one of said disks being tapered from its small front end to its large rear end and turning about an inclined axis, and the other disk being cylindrical and engaging its front part with the rear part of the other disk and turning about an upright axis.

3. A sheet shearing machine comprising coöperating upper and lower cutter wheels or disks, said lower disk turning about an inclined axis and having a cutting edge at its rear end and said upper disk turning about a vertical axis and having a cutting edge at its lower end which engages its front part with the rear part of the cutting edge of the lower disk.

4. A sheet shearing machine comprising coöperating upper and lower cutter wheels or disks, said lower disk turning about an inclined axis and tapering from its small front end toward its large rear end and having a cutting edge on the rear end thereof, and said upper disk turning about a vertical axis and being cylindrical in form and having a cutting edge on the lower end thereof which engages its front part with the rear part of said lower disk.

5. A sheet shearing machine comprising coöperating upper and lower cutter wheels or disks, an inclined spindle carrying said lower disk, a laterally swinging bearing in which said lower spindle is journaled, and a vertical spindle carrying said upper disk.

6. A sheet shearing machine comprising coöperating upper and lower cutter wheels or disks, an inclined spindle carrying said lower disk, a bearing for said lower spindle comprising an axially immovable rear bearing section in which the rear part of the lower spindle is journaled and an axially adjustable front bearing section in which the front part of the lower spindle is journaled, and a vertical spindle carrying said upper disk.

7. A sheet shearing machine comprising coöperating upper and lower cutter wheels or disks, an inclined spindle carrying said lower disk, a bearing for said lower spindle comprising an axially immovable rear bearing section in which the rear part of the lower spindle is journaled and an axially adjustable front bearing section in which the front part of the lower spindle is journaled and which has a screw connection with said rear section, and a spindle carrying the upper disk.

8. A sheet shearing machine comprising coöperating upper and lower cutter wheels or disks, an inclined spindle carrying said lower disk, a lateral bearing in which said lower spindle is journaled and which is pivoted between its ends on an axis at right angles to the axis of said spindle, a horizontal driving shaft, intermeshing gear wheels mounted respectively on the driving shaft and lower spindle, and a spindle carrying said upper disk.

9. A sheet shearing machine comprising coöperating upper and lower cutting wheels or disks, an upright spindle carrying the upper disk, and a supporting head adjustable about a horizontal longitudinal axis and provided with a bearing in which said spindle is journaled.

10. A sheet shearing machine comprising coöperating upper and lower cutting wheels or disks, an upright spindle carrying the upper disk, a supporting head adjustable about a horizontal longitudinal axis and provided with a bearing in which said spindle is journaled and a vertically adjustable carriage on which said head is pivoted.

11. A sheet shearing machine comprising coöperating upper and lower cutting wheels or disks, an upright spindle carrying the upper disk, a supporting head adjustable about a horizontal axis and provided with a lower bearing section in which the lower part of said spindle is journaled, and a bearing sleeve surrounding the upper part of said spindle and journaled in a bearing in the upper part of the supporting sleeve.

12. A sheet shearing machine comprising coöperating upper and lower cutting wheels or disks, an upright spindle carrying the upper disk, a supporting head adjustable about a horizontal axis and provided with a lower bearing section in which the lower part of said spindle is journaled, a bearing sleeve surrounding the upper part of said spindle and journaled in a bearing in the upper part of the supporting sleeve and provided with an external flange engaging with the upper side of said head.

13. A sheet shearing machine comprising coöperating upper and lower cutting wheels or disks, an upright spindle carrying the upper disk, a supporting head adjustable about a horizontal axis and provided with a lower bearing section in which the lower part of said spindle is journaled, a bearing sleeve surrounding the upper part of said spindle and journaled in a bearing in the upper part of the supporting sleeve, a thrust collar arranged on the lower part of said spindle and engaging with the underside of said head, and a screw nut arranged on the upper end of said spindle and engaging with the upper end of said bearing sleeve.

14. A sheet shearing machine comprising coöperating upper and lower cutting wheels or disks, an upright spindle carrying the upper disk, a supporting head adjustable about a horizontal axis and provided with a lower bearing section in which the lower part of said spindle is journaled, a bearing sleeve surrounding the upper part of said spindle and journaled in a bearing in the upper part of the supporting sleeve, a thrust collar arranged on the lower part of said spindle and engaging with the underside of said head, and a screw nut arranged on the upper end of said spindle and engaging with the upper end of said bearing sleeve, a gear wheel mounted on the spindle between the lower end of said sleeve and the lower bearing of said head, and a driving shaft provided with a gear wheel meshing with the gear wheel on the spindle.

15. A sheet shearing machine comprising coöperating upper and lower cutting wheels or disks, an upright spindle carrying the upper disk, a supporting head adjustable about a horizontal axis and provided with a bearing in which said spindle is journaled, a vertically adjustable carriage on which said head is pivoted, a horizontal bearing pivoted on said carriage to swing vertically, a driving shaft journaled in said horizontal bearing and intermeshing gear wheels mounted respectively on said spindle and shaft.

16. A sheet shearing machine comprising coöperating upper and lower cutting wheels or disks, an upright spindle carrying the upper disk, a supporting head adjustable about a horizontal axis and provided with a bearing in which said spindle is journaled, a vertically adjustable carriage on which said head is pivoted and means for fastening said head in place comprising clamping bolts mounted on said carriage and passing through segmental slots in said head.

17. A sheet shearing machine comprising coöperating upper and lower cutting wheels or disks, an upright spindle carrying the upper disk, a supporting head adjustable about a horizontal axis and provided with a bearing in which said spindle is journaled, a vertically adjustable carriage on which said head is pivoted and means for adjusting said carriage comprising a stationary bracket, and an adjusting screw working in said bracket and having a swiveling connection with said carriage.

Witness our hands this 20th day of February, 1913.

PAUL H. LANGE.
HERBERT L. WEIGEL.

Witnesses:
THEO. L. POPP,
ANNA HEIGIS.

Copies of this patent may be obtained for five cents each, by addressing the "Commissioner of Patents, Washington, D. C."